US006549913B1

United States Patent
Murakawa

(10) Patent No.: US 6,549,913 B1
(45) Date of Patent: Apr. 15, 2003

(54) METHOD FOR COMPILING AN IMAGE DATABASE, AN IMAGE DATABASE SYSTEM, AND AN IMAGE DATA STORAGE MEDIUM

(75) Inventor: Akira Murakawa, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/255,355

(22) Filed: Feb. 23, 1999

(30) Foreign Application Priority Data

Feb. 26, 1998 (JP) .......................................... 10-045609

(51) Int. Cl.[7] .............................................. G06F 17/30
(52) U.S. Cl. ...................... 707/104.1; 382/116; 382/118
(58) Field of Search .................... 707/1–10, 100–104.1, 707/200–205; 382/115–127, 168–172, 173–180, 181–231, 232–253; 340/5.8–5.83

(56) References Cited

U.S. PATENT DOCUMENTS

| | | | | |
|---|---|---|---|---|
| 5,012,522 A | * | 4/1991 | Lambert | 382/2 |
| 5,497,430 A | * | 3/1996 | Sadovnik et al. | 382/156 |
| 5,553,277 A | * | 9/1996 | Hirano et al. | 707/104.1 |
| 5,644,765 A | * | 7/1997 | Shimura et al. | 395/615 |
| 5,699,449 A | * | 12/1997 | Javidi | 382/156 |
| 5,802,208 A | * | 9/1998 | Podilchuk et al. | 382/115 |
| 5,838,967 A | * | 11/1998 | Okayama et al. | 395/616 |
| 5,991,429 A | * | 11/1999 | Coffin et al. | 382/118 |
| 5,995,639 A | * | 11/1999 | Kado et al. | 382/118 |
| 6,035,055 A | * | 3/2000 | Wang et al. | 382/118 |
| 6,044,168 A | * | 3/2000 | Tuceryan et al. | 345/582 |
| 6,072,894 A | * | 6/2000 | Payne | 235/375 |
| 6,108,437 A | * | 8/2000 | Lin | 382/118 |
| 6,115,495 A | * | 9/2000 | Tachikawa et al. | 382/165 |
| 6,128,398 A | * | 10/2000 | Kuperstein et al. | 382/118 |
| 6,137,896 A | * | 10/2000 | Chang et al. | 382/118 |
| 6,185,316 B1 | * | 2/2001 | Buffam | 382/100 |
| 6,188,777 B1 | * | 2/2001 | Darrell et al. | 382/103 |
| 6,285,788 B1 | * | 9/2001 | Sezan et al. | 382/217 |
| 6,345,111 B1 | * | 2/2002 | Yamaguchi et al. | 345/863 |
| 2001/0026631 A1 | * | 10/2001 | Slocum et al. | 382/115 |

FOREIGN PATENT DOCUMENTS

| | | |
|---|---|---|
| JP | 5-159063 | 6/1993 |
| JP | 5-159064 | 6/1993 |
| JP | 7-302337 | 11/1995 |
| JP | 8-055133 | 2/1996 |
| JP | 8-221547 | 8/1996 |

OTHER PUBLICATIONS

Automatic Indexing of Facial Region in Video Images by Subspace Projection, by Yoshiaki Sugiyama, Noriyuki Ishikawa, and Yasuo Ariki, pp. 181–186.

A Method of Constructing a Dictionary for Facial Image Recognition Independent of Facial Direction, Japan D–II, vol. J78–D–II, No. 11, pp. 1639–1649, Nov. 1995.

\* cited by examiner

*Primary Examiner*—Greta Robinson
*Assistant Examiner*—Linh Black
(74) *Attorney, Agent, or Firm*—Sidley Austin Brown & Wood LLP

(57) ABSTRACT

A method and system for automatically compiling an image database containing facial images for a large number of people searches all facial images stored in a face dictionary containing image data and attribute information for known persons for all images stored in an image database. When matching facial images are found, the attribute information from the face dictionary is added to the image information in the image database as an index to that information. The current record indicated by a record pointer is loaded to obtain the file path to the image file, which is stored with the data record. The image file is then loaded, the record pointer in the face dictionary is moved to the top, and the current record indicated by the record pointer in the face dictionary is loaded. Attribute information such as personal name, address, sex, and job title, and a facial image or facial features enabling a person to be identified, are stored to each record in the face dictionary, and can therefore be obtained by loading a face dictionary record. A particular person can then be searched for and evaluated based on the image data loaded from the image database, and facial image information loaded from the face dictionary.

19 Claims, 8 Drawing Sheets

METHOD FOR COMPILING AN IMAGE DATABASE, AN IMAGE DATABASE SYSTEM, AND AN IMAGE DATA STORAGE MEDIUM

This application is based on application No. 10-45609 filed in Japan, the contents of which is hereby incorporated by reference.

BACKGROUND OF THE INVENTION

1. Field of the Invention

The present invention relates generally to a method for compiling an image database from which an image of a specific person can be retrieved, and relates more specifically to a method for compiling and automatically indexing a database of facial images by finding a specific person in a dictionary of human facial images and generating an index of personal attributes such as the name, employee number, and/or address of the person in the facial image stored to the image database. The present invention also relates to an image database system, and to an image information storage medium.

2. Description of the Related Art

Rapid advances in information processing technology, combined with improvement in performance of personal computers and other information products, have helped expand the use of image database systems and electronic filing systems from graphic designers, publishers, printers, and other users of large-volumes of images and graphics to even casual users. These image database systems and electronic filing systems typically enable the user to capture images and text using a scanner or other input device, store and manage the captured information in a database together with keywords and other ancillary information for searching and retrieval, and find a specific image in the database for output to hard copy using a printer, or transmission to another user.

A desirable feature of such image storage and retrieval systems is the ability to search the facial area of stored images to confirm the identity of a person. One type of such an image searching and identification system is a recognition system whereby, for example, images of the objects that will be searched for are segmented into an image mosaic, and images are recognized by applying an aspect method using image features detected from the mosaics.

Japanese Patent Laid-Open Publication No. 5-159063, for example, teaches an image searching system whereby images of reference objects are segmented into image mosaics and stored in a reference dictionary of search objects. An image of an unidentified object is then similarly segmented into an image mosaic for comparison with the reference object mosaics in the reference dictionary. The desired image is then selected from among a plurality of candidate images displayed on screen.

Another image searching system as taught in Japanese Patent Laid-Open Publication 5-159064 similarly compares a mosaic of an unidentified image against the content of a dictionary containing mosaics of reference images using an approximate-match searching means for comparison using a coarse image mosaic, and a detail searching means for comparison using a dense image mosaic.

A paper in Proceedings of the electronic information communication association of Japan D-II No. 11 (1995 November issue) also describes a method of optimizing an image dictionary based on image-to-image distances detected from differences in facial orientation, and statistical analysis of differing intrafacial distances in individual faces.

The known systems described above, however, make no mention of assigning or creating an index for efficiently searching a database for specific image data. When optimized keywords or other identifying information are not added to the images stored in a large-volume image database so that stored images can be retrieved as and when required, the above-described image database systems and electronic filing systems are unable to quickly retrieve a needed image. As a result, these systems are generally difficult to deploy for practical purposes.

The present invention is therefore directed to a method for resolving the aforementioned problems of conventional image database systems and electronic filing systems. More specifically, an object of the present invention is to provide a method for compiling an image database storing facial image information for a large number of people so that desired image information can be easily retrieved as required.

A further object of the present invention is to provide an image database system for automating the compilation of an image database storing facial image information for a large number of people.

A yet further object of the present invention is to provide an image database system for capturing and compiling external image information in an image database.

Yet a further object of the present invention is to provide an image database system for capturing facial image information and related attributes from a business card[, for example,] on which a person's face is printed, and storing the captured facial information together with the captured attribute values in an image database.

Another object of the present invention is to provide an image database system for compiling an image database using a face dictionary stored to, for example, CD-ROM, a hard disk, or other computer-readable medium.*

Yet another object of the present invention is to provide an image database system for finding desired image information in an image database, and then outputting the necessary image information to an external device, including to a printer for printing a desired number of images to hard copy.

SUMMARY OF THE INVENTION

To achieve the above-noted objects, an image database compiling method according to the present invention relates to an image database in which a facial image of a person is stored with related attribute information to enable searching and retrieving required image information based on the related attribute information. This compiling method comprises a registration step for storing human facial information together with related attribute information in a face dictionary; and a comparison step for comparing a facial image contained in image information stored or to be stored in the image database with dictionary image information stored in the face dictionary. When dictionary image information matching registered image information in the image database is detected, the attribute information stored with the dictionary image information is stored with the registered image information in the image database.

Facial images for a large number of people are previously stored in a face dictionary together with related attribute information. When new image information is stored in the image database, the facial image information to be registered in the image database is compared with facial images in the face dictionary. If a match is detected, the attribute information stored with the facial image in the face dictionary is retrieved and stored with the facial image in the image database.

Alternatively, the present invention achieves the above-noted objects by means of an image database system for storing facial images for a plurality of people together with related attribute information to enable searching and retrieving required image information based on the related attribute information. This image database system comprises a face dictionary for storing human facial information together with related attribute information; a means for comparing a facial image contained in image information stored or to be stored in the image database with dictionary image information stored in the face dictionary; and a means for storing attribute information stored with dictionary image information with image information registered in the image database when dictionary image information matching image information registered in the image database is detected.

Facial images for a large number of people are previously stored in a face dictionary together with related attribute information. When the means compares image information stored in the image database the facial images in the face dictionary and detects a match, the storing means stores the attribute information stored with the facial image in the face dictionary with the facial image in the image database.

The image database system according to the present invention further preferably comprises a means for capturing human facial image information to be stored in the image database. This capturing means gathers facial images of the people to be registered in the database.

Yet further preferably, the capturing means simultaneously captures personal attribute information and facial image from a business card for storage to the registered image information storing means.

When a facial image of the person is printed together with the person's name, job title, and other attribute information on the business card, the capturing means can simultaneously capture both a facial image and attribute information from the business card for storage to the image database.

Yet further preferably, the face dictionary is stored to a CD-ROM. Using the large storage capacity of the CD-ROM medium, a face dictionary containing a large volume of facial images and attribute information can be made available for referencing when compiling the image database.

Alternatively, the face dictionary is stored to a hard disk. In this case a face dictionary containing a large volume of facial images and attribute information can be made available for referencing when compiling the image database, and the face dictionary can be quickly referenced for faster indexing because of the high access speed of the hard disk.

Yet further preferably, the registered image information storing means is stored to a hard disk. In this case a large-volume image database can be stored to hard disk for fast access.

Yet further preferably, the image database system comprises a means for retrieving required image information from the image database based on attribute information, and printing a required number.

In this case, all of the image information stored in the image database and containing the attribute information specified for the search can be printed out.

Yet further preferably, the image database system comprises a means for retrieving required image information from the image database based on attribute information, and then transmitting the information.

In this case, all of the image information stored in the image database and containing the attribute information specified for the search can be transmitted to an external device.

In the practice of the present invention, the face dictionary may be that stored to any suitable storage device, for example, CD-ROM or a hard disk.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

The preferred embodiments of an image database compiling method, an image database system, and an image information storage medium according to the present invention are described below with reference to the accompanying figures.

(A) System Configuration

Figure 1:
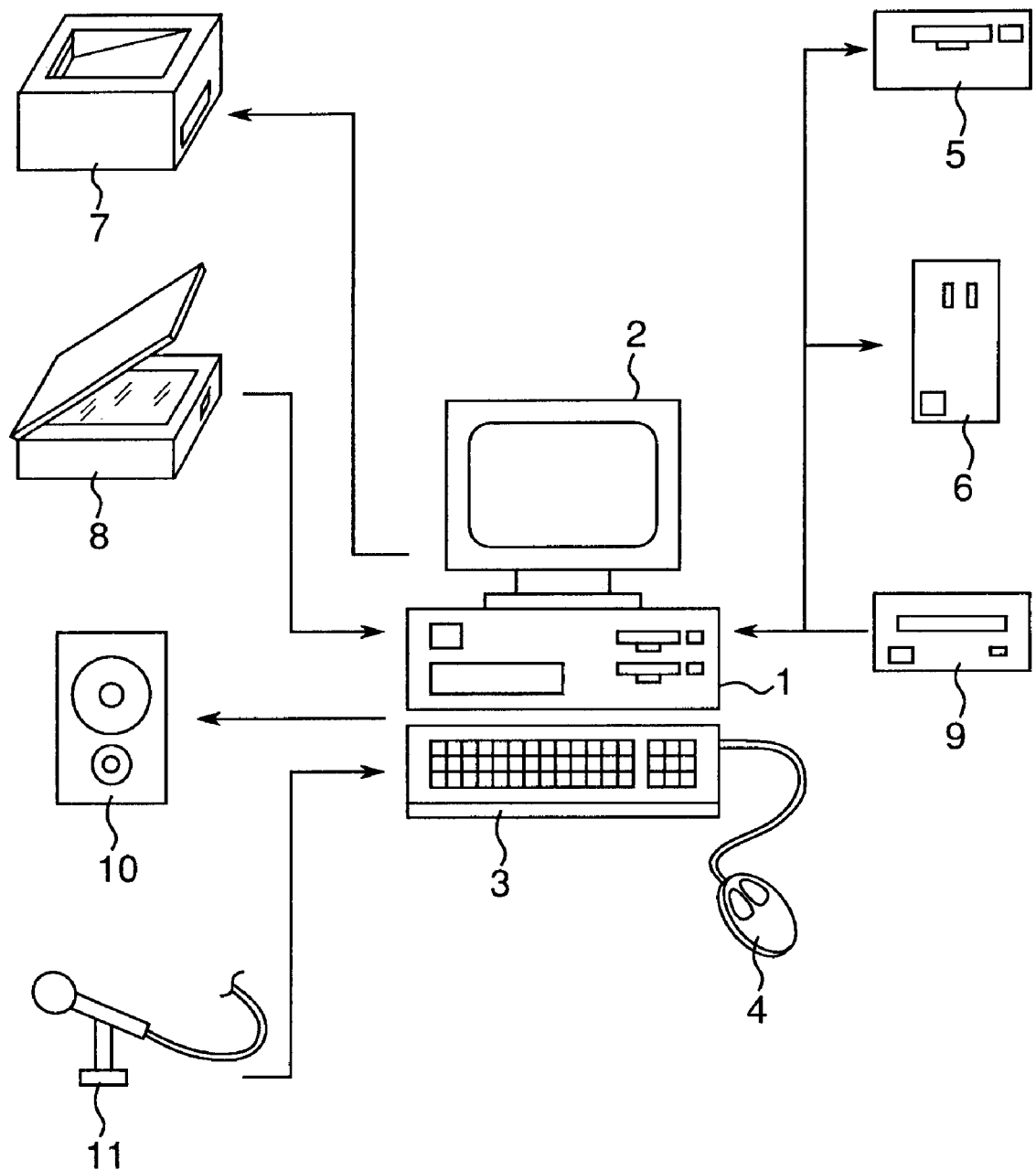
FIG. 1 is a typical block diagram of an image database system according to a preferred embodiment of the present invention.

FIG. 1 shows the basic configuration of an image database system according to a preferred embodiment of the present invention. As will be known from FIG. 1, this system is built around a control device 1 for controlling the overall system and comprising a central processing unit (CPU). Connected to this exemplary control device 1 are: a display 2 for displaying text and images, as well as control prompts and other interface elements; a keyboard 3 and mouse 4 for data entry and operating the system; a floppy disk drive 5 and a hard disk drive 6 for reading and writing data to a data storage medium; a printer 7 for printing text, image data, and drawings prepared using an image editor to hard copy; a scanner 8 for capturing image data; a CD-ROM drive 9 for accessing data stored to a CD-ROM; a loudspeaker 10 for audio output; and a microphone 11 for audio input.

It should be noted that the arrows shown in FIG. 1 indicate the direction of data flow in this exemplary system.

Figure 2:
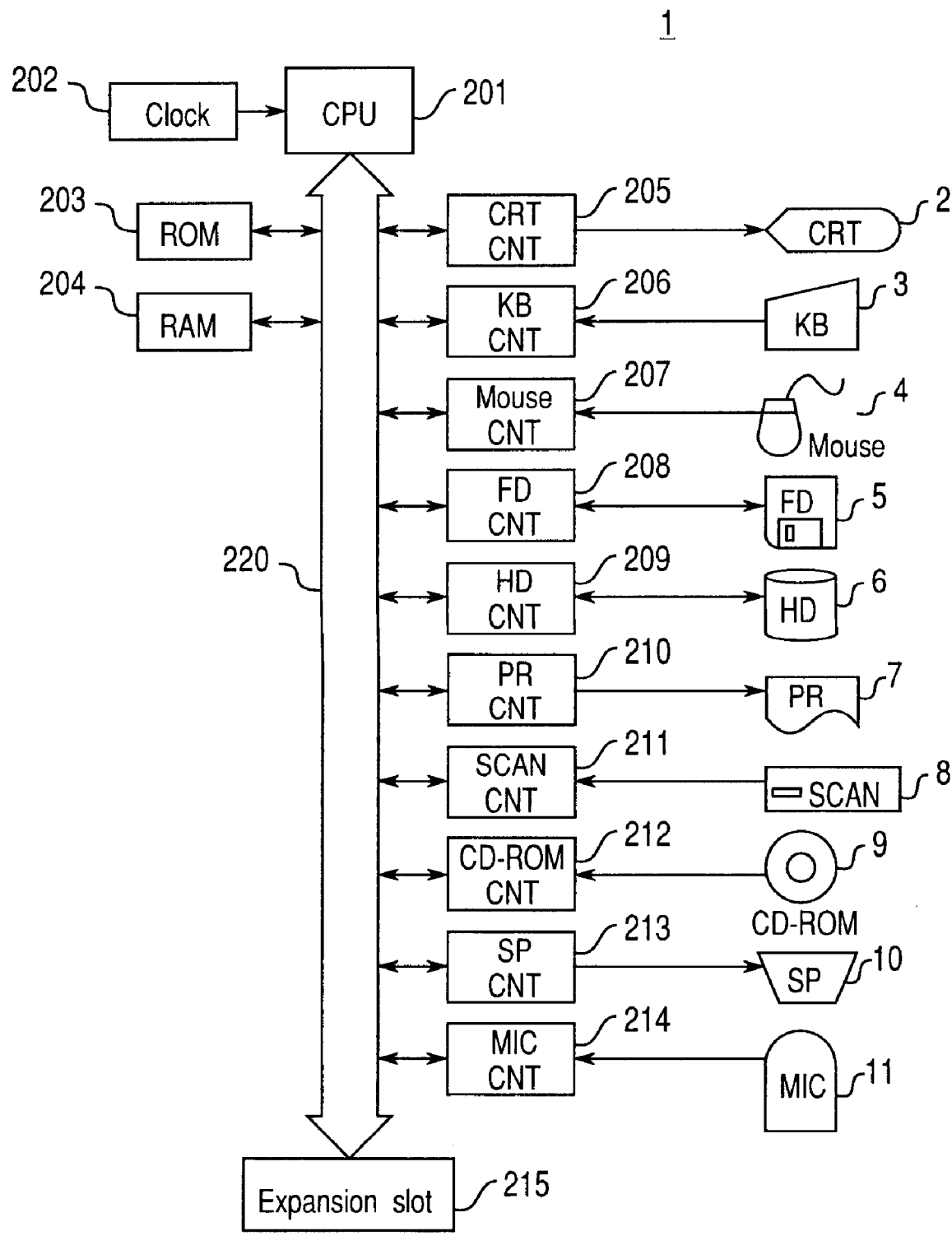
FIG. 2 is a block diagram of primarily the control device of the image database system shown in FIG. 1.

FIG. 2 is a block diagram of the image database system shown in FIG. 1. The control device 1 is built around, for example, an Intel i80486DX or other central processing unit (CPU) 201. Connected directly to the CPU 201 is a clock pulse generator 202 for generating the reference clock required to regulate system operations. A ROM 203 for storing an application program for controlling the image database system, and a RAM 204 for temporarily storing data and programs used by the CPU 201 for system control, are connected to the CPU 201 via a data bus 220.

Circuits connected to the CPU 201 via the data bus 220 include: a display control circuit 205 for controlling the display 2 to display text and graphics; a keyboard control circuit 206 for controlling transfer of input from the keyboard 3; a mouse control circuit 207 for controlling transfer of input from the mouse 4; a floppy disk drive control circuit 208 for controlling the floppy disk drive 5; a hard disk drive control circuit 209 for controlling the hard disk drive 6; a printer control circuit 210 for controlling output to the printer 7; a scanner control circuit 211 for controlling the scanner 8; a CD-ROM drive control circuit 212 for controlling the CD-ROM drive 9; a speaker control circuit 213 for controlling the speaker 10; and a microphone control circuit 214 for controlling the microphone 11. An expansion slot 215 for connecting different types of system expansion boards is also connected via the data bus 220.

It should be noted that a SCSI board, for example, can be connected to the expansion slot 215 and used for connecting a floppy disk drive 5, hard disk drive 6, scanner 8, CD-ROM drive 9, or other device. It should also be noted that while a floppy disk drive 5 and hard disk drive 6 are the preferred image data storage means in this exemplary system, the invention shall obviously not be limited thereto as any other computer-readable data storage medium that the system can use can be used for image data storage, including magneto-optical (MO) disks and DVD disks.

Furthermore, while a scanner 8 is used in this exemplary system for image data capture and input, other data input devices can also be used, including video still cameras and digital cameras. In addition, while a printer 7 is used as an output device, a digital photocopier or other type of hard copy output device can also be used. Data can also be output to another computer, for example, using a digital communications line.

A control program is also stored to ROM 203 in this preferred embodiment. This control program, however, can be alternatively stored in whole or in part to another data storage medium, including a floppy disk 5, hard disk drive 6, or CD-ROM 9 In this case, the required data and program content can be read from the data storage medium as needed, buffered to RAM 204, and executed from RAM 204.

(B) System Operation

A control program run by an image database system according to the present invention thus comprised is described next below with reference to FIG. 3 to FIG. 8.

Main Control Loop

Figure 3:
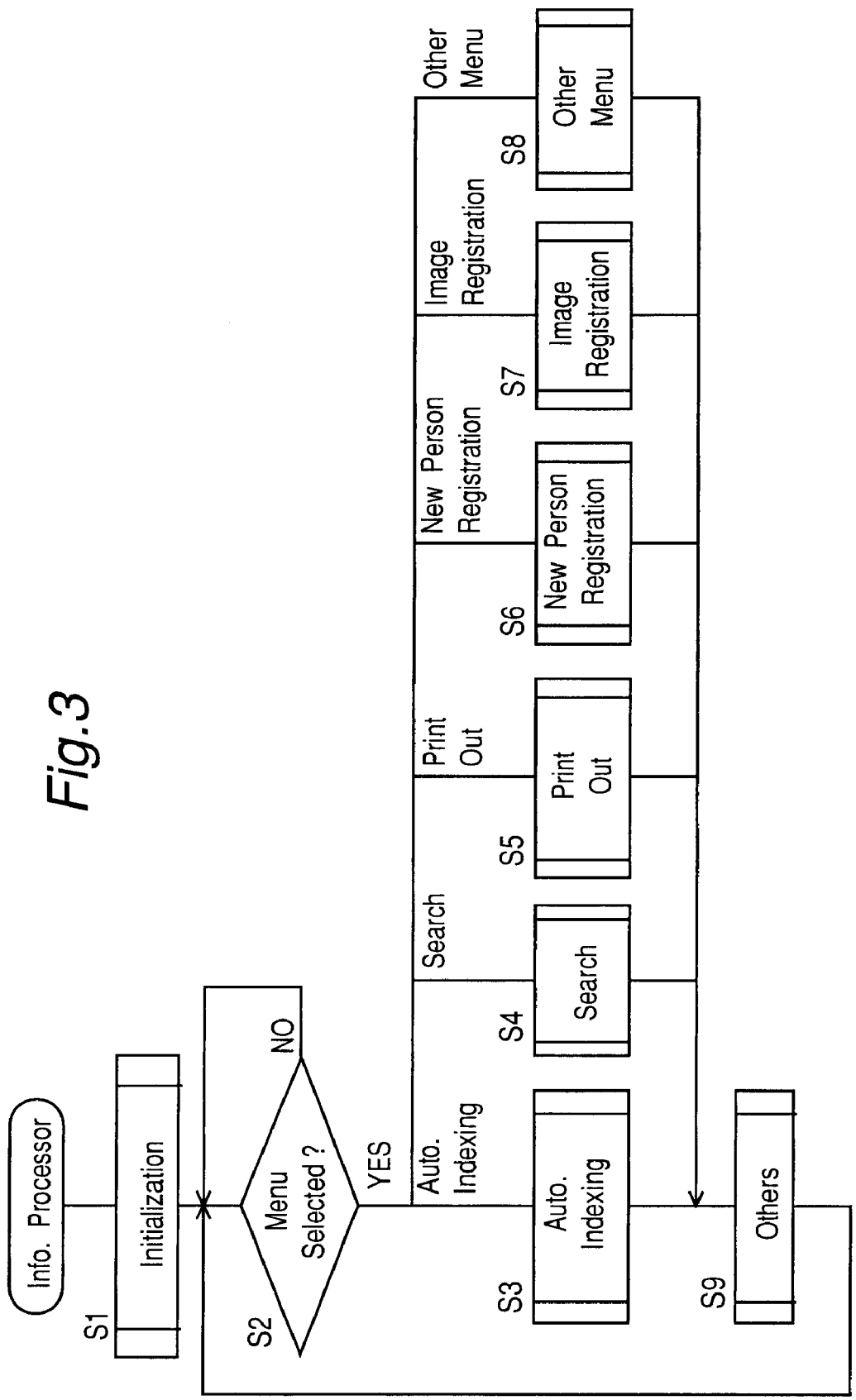
FIG. 3 is a flow chart of the main control loop of the control device in the image database system shown in FIG. 1.

FIG. 3 is a flow chart of the main loop of a control program run by the CPU 201 in the image database system shown in FIG. 1 for automatically indexing facial images. As shown in FIG. 3, the procedure starts by initializing the various flags and variables used in the rest of the procedure, and to display the default menus (S1). After initialization in step S1, decision diamond S2 detects whether the user has selected a menu item from the default menu screen (S2).

If step S2 returns "no" because the user has made no menu selection, step S2 is simply repeated until a menu item is selected.

When the user makes a menu selection (step S2 returns "yes"), the procedure corresponding to the menu selection is executed. The menu possible selections shown in FIG. 3 are: automatic indexing (S3), searching (S4), printing (S5), registering a new person (S6), registering an image (S7), and other menu selections (S9). After the selected procedure is run, the main control loop advances to step S9. After the procedure defined for step S9 is run and completed, the main control loop returns to step S2 and repeats.

The automatic indexing process (S3), search process (S4), printing process (S5), new person registration process (S6), and image registration process (S7) are described next below with reference to the flow charts thereof in FIG. 4 to FIG. 8. It should, however, be noted that the tasks that might be performed as the "other menu process" selected in S8, and the "other" routine performed as step S9, are not unique to or directly related to the present invention, and further description thereof is thus omitted below.

Automatic Indexing Process

Figure 4:
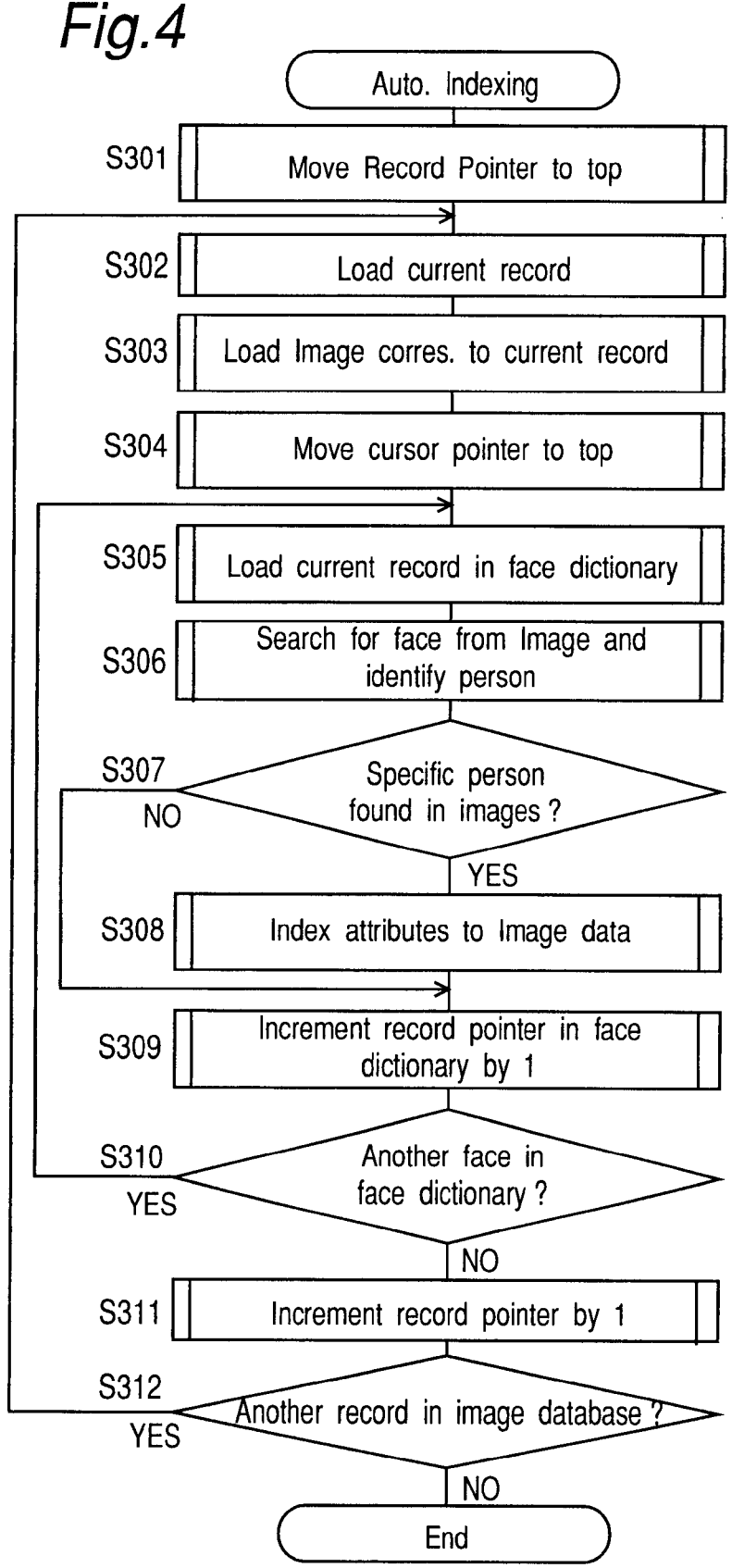
FIG. 4 is a flow chart of the automatic indexing process shown as step S3 in FIG. 3.

The automatic indexing process shown in FIG. 4 is run when the corresponding menu item is selected in the main control loop shown in FIG. 3. This process searches a face dictionary storing facial image data together with related attribute values to find an image matching each image stored in an image database. When a match is found, the attribute information from the dictionary is then used to generate an index of attribute information for the person represented by the image data. This attribute information can be any information enabling a person to be identified, including, for example, the person's name, employee number, student number, or other identifier. For simplicity, therefore, this preferred embodiment is described below as indexing the person's name.

When the menu item for the automatic indexing process is selected and the process begins, the first step is to move the record pointer to the top (first) record (step S301). The current record, that is, the record currently indicated by the record pointer, is then loaded (step S302) to fetch the file path to the corresponding image file. Note that the file path is part of the record content in this preferred embodiment. Note, further, that there is a 1:1 correspondence between images stored in the image database and database records, and if the file path to the corresponding image file is stored as part of the database record, the location of the image file can be known by loading the record.

The image file is then loaded (step S303), the record pointer in the face dictionary is moved to the top (beginning) of the dictionary (step S304), and the dictionary record indicated by the record pointer is loaded (step S305). Note that in this preferred embodiment the person's name, address, sex, job title, and other attribute information, as well as a facial image and/or facial features enabling the person's face to be uniquely identified, are stored in each record of the face dictionary. This stored information can obviously also be known by loading a dictionary record.

Using the facial image information loaded in step S305 from the face dictionary, the procedure then searches the image data loaded in step S303 from an image file (the image database) to find the specific person identified by the current record in the face dictionary, and evaluates whether there is a match between the dictionary record and the image file. It should be noted that various methods can be used for this evaluation, including the methods described above with reference to Japanese Patent Laid-Open Publication No. 5-159063 and No. 5-159064, and the paper in Denshi Joho Tsushin Gakkai Ronbunshi D-II No. 11 (1995 Nov. issue).

Based on the result of the evaluation in step S306, decision diamond S307 determines whether the specific person was found in the image. If S307 returns "yes," the name attribute loaded from the face dictionary record is added to the image data index (step S308). As a result, it is now possible to search the image database by name for a specific person.

The record pointer in the face dictionary is then incremented one (step S309). This record pointer is also incremented (step S309) if the specific person is not identified in the image (S307 returns "no").

After the dictionary record pointer is incremented (S309), decision diamond S310 determines whether there is another record in the face dictionary. If there is (S310 returns "yes"), the procedure loops back to step S305 and repeats. If there is not (S310 returns "no"), the record pointer in the image database is incremented (step S311).

After the record pointer is incremented, decision diamond S312 determines whether there is another record in the image database. If there is (S312 returns "yes"), the procedure loops back to step S302 and repeats. If there is not (S312 returns "no"), the automatic indexing procedure ends.

It is therefore possible by means of the present invention to automatically index image data stored in an image database using attributes for identifying a person in the image data.

New Person Registration Process

Figure 5:
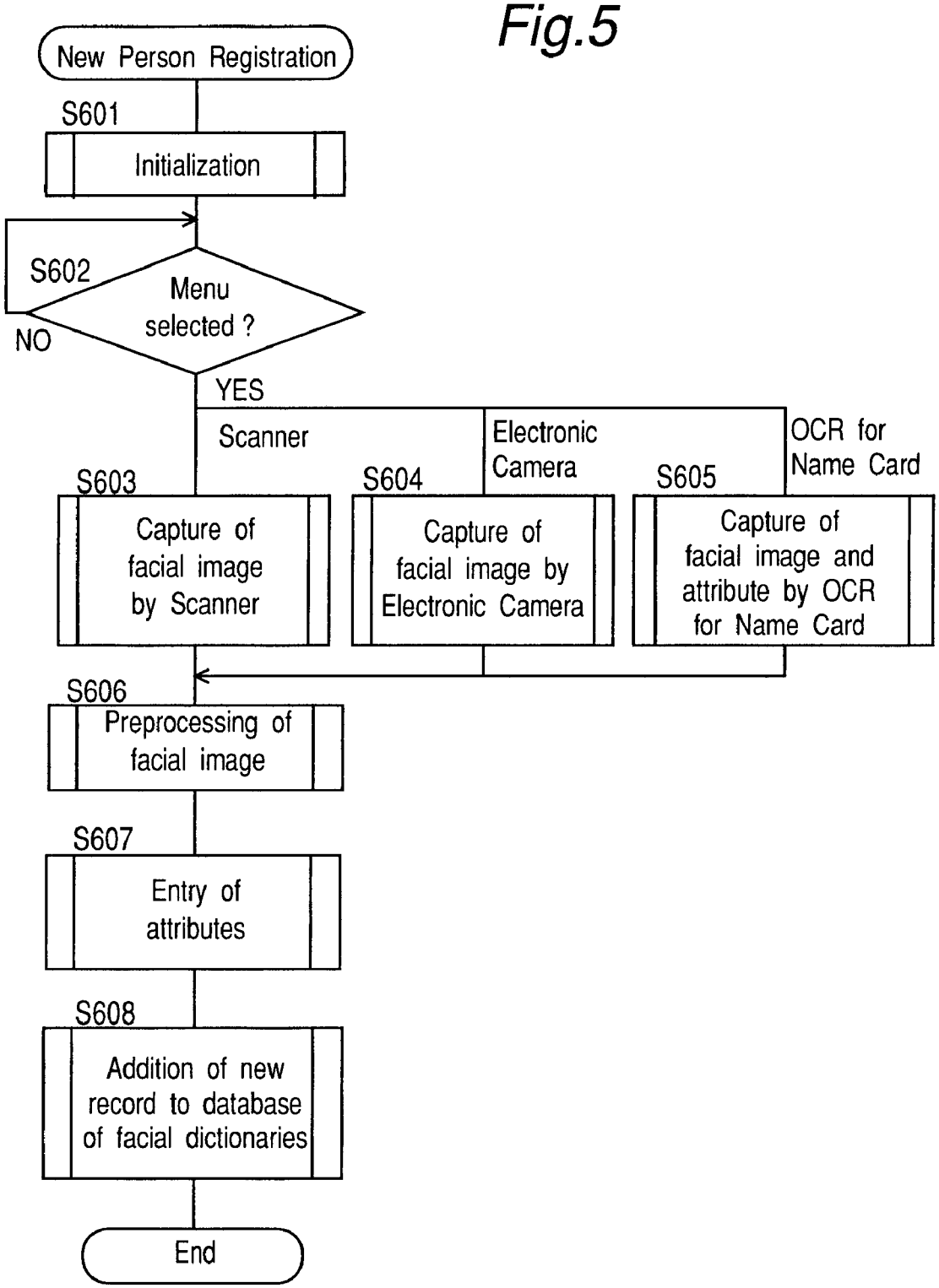
FIG. 5 is a flow chart of the new person registration process shown as step S6 in FIG. 3.

The new person registration process shown in FIG. 5 is run when the corresponding menu item is selected in the main control loop shown in FIG. 3. This process stores a new entry in the face dictionary where each entry includes a facial image or facial features, and attribute information such as the name, sex, and address information as described above.

When the menu item for the new person registration process is selected and the process begins, the first step is to display a personal information entry screen and initialize necessary data (step S601). Decision diamond S602 then determines whether a menu item indicating a desired input method has been selected (step S602). This step S602 repeats until a menu selection has been made. It should be noted that various input methods can be used in this preferred embodiment, including: using a scanner, capturing images with an electronic camera, and scanning a business card with OCR processing to additionally capture attribute information.

When the menu item for capturing a facial image with a scanner is selected, a facial image is read in using a scanner (step S603). When the menu item for capturing a facial image with an electronic camera is selected, a facial image is captured from an electronic camera (step S604). Likewise, when the menu item for scanning a business card with OCR processing is selected, a facial image and additional attribute information is read from a business card using a corresponding OCR process (step S605). Note that in the case of a business card it is herein assumed that a facial image is printed on the card in addition to the name and other attribute information. The process of step S605 therefore separates the facial image information from text information, and detects the name, job title, company name, and/or other text-based information using optical character recognition to determine the attribute values.

The facial image captured by step S603, S604, or S605 is then preprocessed (step S606). This preprocessing step includes extracting the facial area from the captured image, normalization to scale the facial image to a standard size, and facial feature extraction.

Personal attributes such as the name, address, and job title are then entered using an attribute entry screen (step S607). Note that if the business card OCR process is selected, the attribute information is automatically displayed in the corresponding parts of the attribute entry screen, enabling the user to confirm and edit the attribute information as necessary.

The information for a new person obtained through steps S601 to S607 is then added to the face dictionary as a new record (step S608), and the procedure then ends.

It will be obvious to one with ordinary skill in the related art that while textual information is captured from a business card above, information can be alternatively captured from other sources, including a resume.

Search Process

Figure 6:
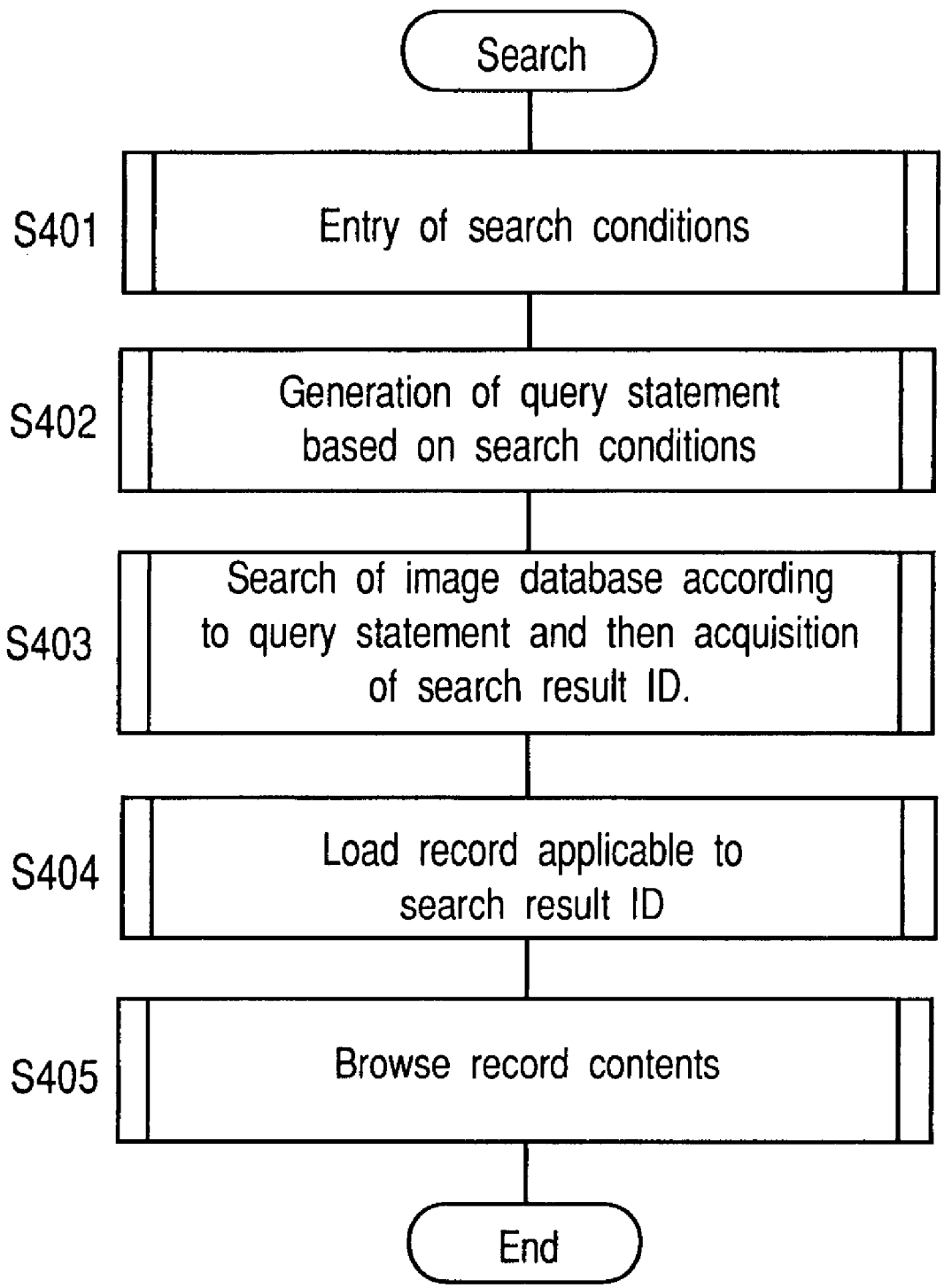
FIG. 6 is a flow chart of the search process shown as step S4 in FIG. 3.

The search process shown in FIG. 6 is run when the corresponding menu item is selected in the main control loop shown in FIG. 3. This search process searches for and displays a specific person based on personal attribute information such as the name, sex, and address.

When the menu item for the search process is selected and the process begins, the first step is to define the search conditions, such as the person's name, using a displayed search settings screen (step S401). A query statement is then generated (step S402).

The image database is then searched using the query statement (step S403), and a search result identifier obtained. It will here be obvious that by indexing the personal attribute data of the image data, it is possible to [efficiently] find the image of a specific person by searching the index to find the desired attribute value and then loading the associated image.

The record corresponding to the search result identifier obtained in step S403 is then loaded (step S404), and the record content is displayed (step S405). The search process then ends.

Printing Process

Figure 7:
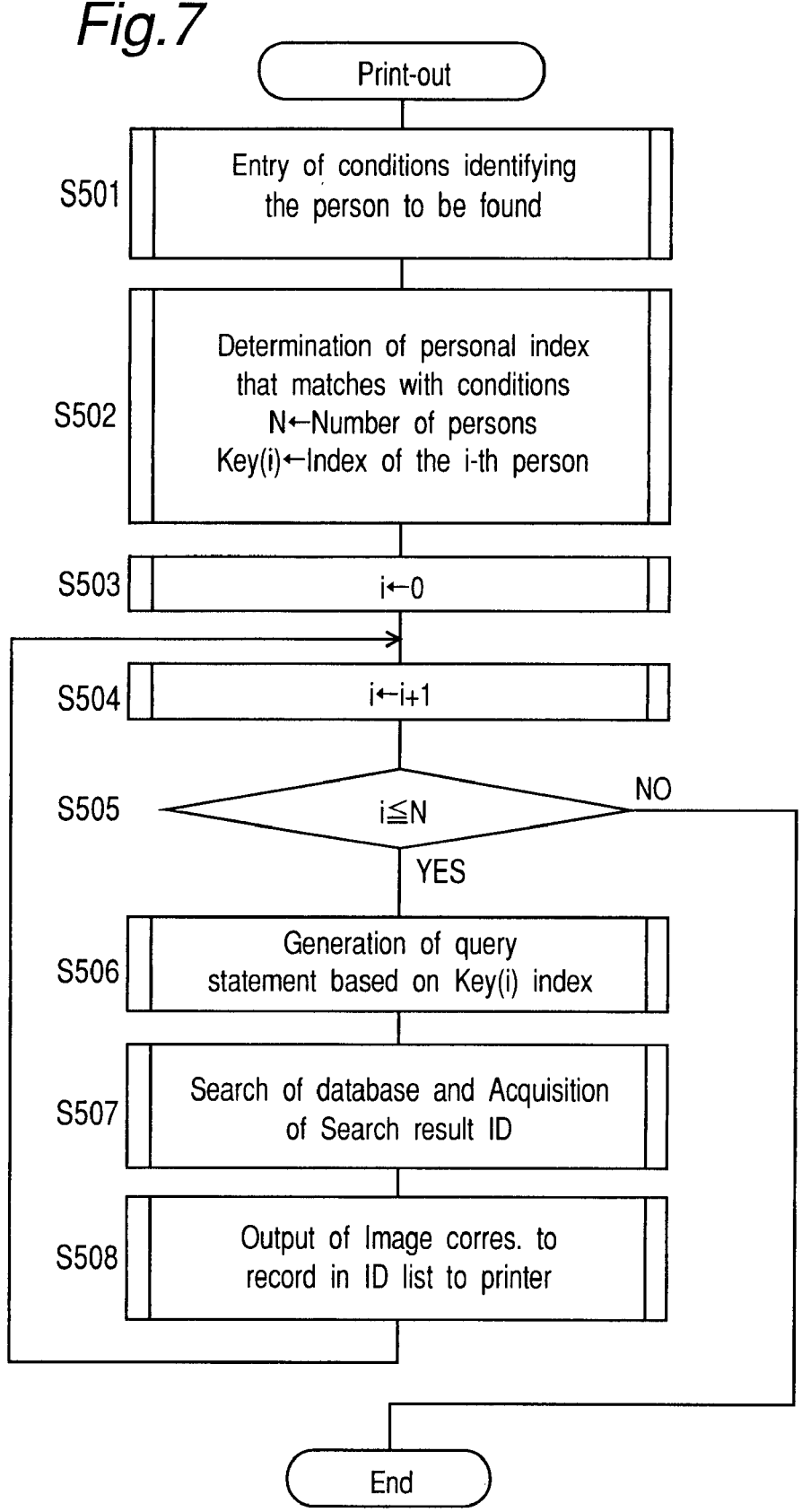
FIG. 7 is a flow chart of the printing process shown as step S5 in FIG. 3.

The printing process shown in FIG. 7 is run when the corresponding menu item is selected in the main control loop shown in FIG. 3. This printing process finds an image containing a specific person based on personal attribute information such as the name, sex, and address, and then prints the image to hard copy.

When the menu item for the printing process is selected and the process begins, the first step (step S501) is to define the conditions identifying the person to find and print out, such as the person's name, using a displayed print settings screen. A query statement is then generated and the index is searched for a person matching the search criteria (step S502). It is here assumed that there are N people matching the conditions, and key[i] is the index entry to the i-th person. The type of attribute used for the search is not relevant insofar as the attribute is indexed. For simplicity, therefore, assume that the image data has an index of personal names, and the search is by name.

A loop counter i is first set to a default of zero (0) (step S503), and then incremented (step S504). Loop counter i and people counter N are then compared (step S505). If the loop counter i is less than or equal to people counter N, that is, (i≦N) (step S505 returns "yes"), step S506 is performed. If step S505 returns "no," the printing process ends.

If the loop counter i is less than or equal to people counter N (i_N) (step S505 returns "yes"), a query statement searching for the image data containing the key[i] value is generated (step S506). The image database is then searched using the query statement, and a list of image data identifiers is obtained as the search result (step S507).

Based on this list of identifiers, the image data records are loaded and output to the printer (step S508), and the procedure then loops back to step S504. It should be noted that by printing one image for one image data identifier, all images containing a specific person can be printed without missing any images.

Image Registration Process

Figure 8:
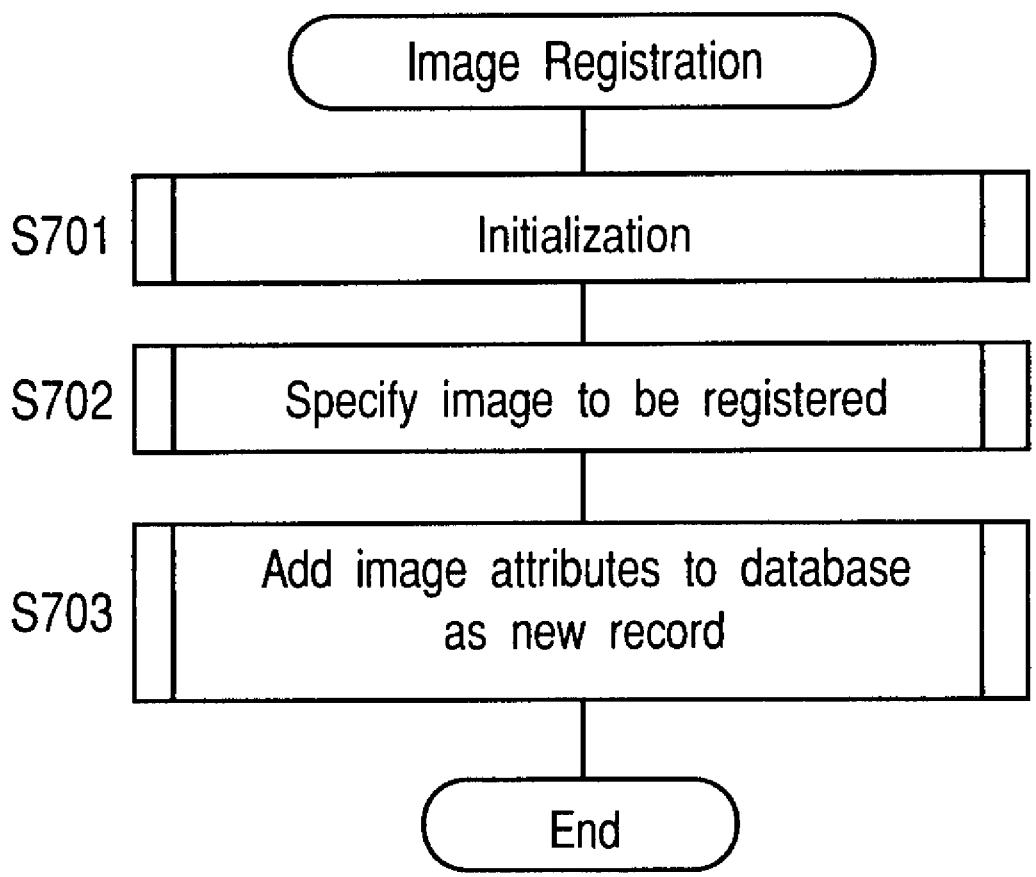
FIG. 8 is a flow chart of the image registration process shown as step S7 in FIG. 3.

The image registration process shown in FIG. 8 is run when the corresponding menu item is selected in the main control loop shown in FIG. 3. This process stores an image in the image database on, for example, a hard disk drive 6. It will be obvious that image data captured by a scanner 8 or electronic camera, for example, can also be stored to the image database. For simplicity, however, assume below that the image data has already been captured to hard disk drive 6, from where it is read and stored to the database.

When the menu item for the image registration process is selected and the process begins, the first step (step S701) initializes an image registration screen and data. The image to store in the database is then specified (step S702) by, for example, defining the file path to the image file. The image file path and/or other attribute information is then stored to the image database as a new record (step S703), and the procedure ends.

It will be obvious that while the automatic indexing process of the present invention is applied to image data previously stored in the image database, automatic indexing can also be applied when a new image record is created. This can be accomplished by simply inserting an automatic indexing process as described above between steps S702 and S703 in FIG. 8.

As will be known from the above description of the present invention, image information containing facial images of a large number of people is stored together with identifying personal attributes in a face dictionary. When new image information is then registered in the database, a facial image of the person about whom image and attribute information is to be stored in the image database is compared with the image information in the dictionary. When a match is detected between the database image information and the dictionary image information, the attribute information stored with that dictionary record is stored with the image information record in the image database.

It is therefore not necessary to add an index for managing image information, and managing image information is thus made easier. Efficient searching for a specific image is also simple based on the attribute information. The attribute information can also be combined in various ways to enable complex searches based on multiple criteria.

An image information comparing means compares facial image information to be stored in the image database with facial image information stored in a face dictionary. When a match between the image information in the image database and a record in the face dictionary is detected, an image information storing means stores the attribute information stored with the dictionary image information with the image information stored in the image database. It is therefore possible to automatically append attribute information enabling easier, more efficient management of image information, and the burden of building and managing an image database can be greatly reduced for the user.

Furthermore, if the facial image information for persons to be stored in the image database is obtained by an image information capturing means, facial images can be captured from photographs, business cards containing a facial image of the person, and other sources, and registered in the image database.

Furthermore, when a facial image is printed on a business card in addition to such attribute information as the name and job title of the person, such attribute information can also be captured by the image information capturing means. As a result, a person's facial image and other attributes can be simultaneously captured from a business card by the image information capturing means, thereby reducing the burden of entering attribute information when capturing image information from a business card to an image database.

Yet further, a face dictionary containing facial image information and related attribute information can be recorded to a CD-ROM. Because CD-ROMs have large capacity and are easily mass produced, a variety of image databases can be easily compiled using CD-ROM media.

A face dictionary containing facial image information and related attribute information can also be recorded to a hard disk. Because hard disks typically feature high speed access, a large volume of image data can be compared in a short period of time. As a result, an image database can be efficiently compiled in a short time.

By further recording the data for the image database to a hard disk, data searches can be completed in a short time, and required image data can be efficiently retrieved.

Yet further, by searching based on specified attribute information, all stored image information containing the attribute information specified for the search can be easily retrieved and then printed to hard copy and/or transmitted to another device.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method of compiling an image database in which facial images for a plurality of people are stored with related attribute information to enable searching and retrieving required facial images based on the related attribute information, said method comprising the following steps of:

storing facial image information together with attribute information corresponding to the facial image information in a face dictionary; and comparing a facial image stored or to be stored in the image database with the facial image information stored in the face dictionary, wherein, when the facial image information matching the facial image exists in the face dictionary, the attribute information, which is stored in the face dictionary corresponding to said matching facial image information, is stored in the image database as related attribute information of the facial image.

2. An image database system for storing facial images for a plurality of people together with related attribute information to enable searching and retrieving required facial images based on the related attribute information, said image database system comprising:

a face dictionary for storing facial image information together with attribute information corresponding to the facial image information; and a processor for comparing a facial image stored or to be stored in the image database with the facial image information stored in the face dictionary, wherein, when the facial image information matching the facial image exists in the face dictionary, said processor stores the attribute information, which is stored in the face dictionary corresponding to said matching facial image information, in the image database as related attribute information of the facial image.

3. An image database system as set forth in claim 2, further comprising a capturing means for capturing a facial image to be stored in the face dictionary to obtain the facial image information.

4. An image database system as set forth in claim 3, wherein said capturing means simultaneously obtains the facial image information and the corresponding attribute information by capturing an image of a business card for storage to the face dictionary.

5. An image database system as set forth in claim 2, wherein the face dictionary is stored in a CD-ROM.

6. An image database system as set forth in claim 2, wherein the face dictionary is stored in a hard disk.

7. An image database system as set forth in claim 2, further comprising a printer for printing the retrieved facial images.

8. A computer-executable program for compiling an image database in which facial images for a plurality of people are stored with related attribute information to enable searching and retrieving required facial images based on the related attribute information, said program comprising:

instructions for storing facial image information together with attribute information corresponding to the facial image information in a face dictionary; and instructions for comparing a facial image stored or to be stored in the image database with the facial image information stored in the face dictionary;

wherein, when the facial image information matching the facial image exists in the face dictionary, the attribute information, which is stored in the face dictionary corresponding to said matching facial image information, is stored in the image database as related attribute information of the facial image.

9. A computer-readable medium having computer-executable instructions recorded thereon for compiling an image database in which a facial image of a person is stored with related attribute information to enable searching and retrieving required facial images based on the related attribute information, said instructions comprising:

a first set of instructions for storing facial image information together with attribute information corresponding to the facial image information in a face dictionary;

a second set of instructions for comparing a facial image stored or to be stored in the image database with the facial image information stored in the face dictionary; and a third set of instructions for storing, when the facial image information matching the facial image exists in the face dictionary, the attribute information, which is stored in the face dictionary corresponding to said matching facial image information, in the image database as related attribute information of the facial image.

10. A computer-readable medium in accordance with claim 9, further comprising a fourth set of instructions for capturing a facial image to be stored in the face dictionary to obtain the facial image information.

11. A computer-readable medium in accordance with claim 10, wherein said fourth set of instructions for capturing the facial image includes instructions for simultaneously obtaining the corresponding attribute information by capturing an image of business card for storage to the face dictionary.

12. A computer-readable medium in accordance with claim 11, wherein said fourth set of instructions includes instructions for performing an OCR process on data obtained by capturing the image of the business card.

13. A method in accordance with claim 1, further comprising a step of capturing a facial image to be stored in the face dictionary to obtain the facial image information.

14. A method in accordance with claim 13, wherein said step of capturing the facial image includes simultaneously obtaining the corresponding attribute information by capturing an image of a business card for storage to the face dictionary.

15. A method in accordance with claim 14, wherein said step of capturing the facial image includes performing an OCR process on data obtained by capturing the image of the business card.

16. An image database system as set forth in claim 3, wherein said capturing means is a device selected from the group consisting of a scanner, a digital camera, and a video still camera.

17. A computer-executable program in accordance with claim 8, further comprising instructions for capturing a facial image to be stored in the face dictionary to obtain the facial image information.

18. A computer-executable program in accordance with claim 17, wherein said instructions for capturing the facial image includes instructions for simultaneously obtaining the corresponding attribute information by capturing an image of a business card for storage to the face dictionary.

19. A computer-executable program in accordance with claim 18, wherein said instructions for capturing the facial image include instructions for performing an OCR process on data obtained by capturing the image of the business card.

* * * * *